Patented Aug. 25, 1931

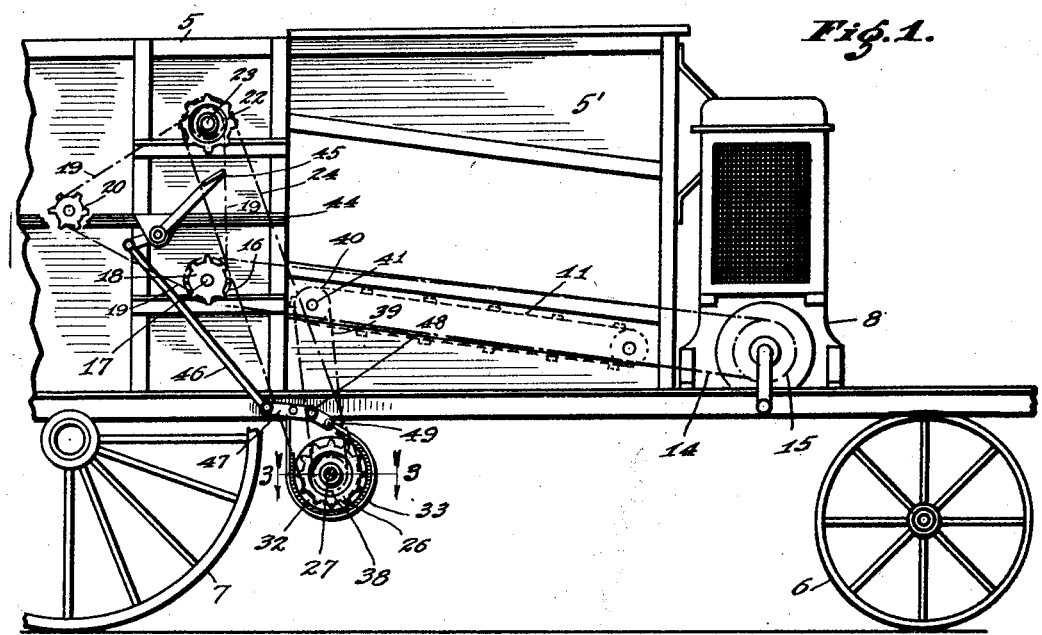

1,820,570

UNITED STATES PATENT OFFICE

NORMAN R. KRAUSE, OF RACINE, WISCONSIN, ASSIGNOR TO J. I. CASE COMPANY, OF RACINE, WISCONSIN, A CORPORATION

COMBINATION HARVESTER THRASHER

Application filed February 3, 1930. Serial No. 425,387.

In the operation of field machinery such as a combination harvester-thrasher it commonly occurs that the header, embodying cutting and conveying mechanisms, picks up stones and other foreign or undesirable matter which are carried by the conveyer to the thrasher with the cut grain, causing serious damage and consequent delays in harvesting, for the reason that no means have been provided, to the best of my knowledge, whereby the operator may instantly stop the conveyor before permitting it to carry undesirable material into the thrasher; and my invention, therefore, relates to improved means for controlling the traveling canvas conveyer of the header element and the feeder conveyer of the thrasher which coacts with the header conveyer, as well as other actuating parts thereof if desired, my object being to provide means under convenient control of the operator whereby the header conveyer may be instantly stopped in its movement when approaching obstructions or picking up objects or material unfit to be delievered into the thrasher and its operation as readily continued, said feeder conveyer being also simultaneously likewise controlled, and which improvements may be applicable to other types of harvesters not only for the purpose specified but also to prevent the machine from becoming clogged in harvesting very heavy and weedy grain by instantly discontinuing the operation of the conveyers and cutting mechanisms when such unfavorable conditions arise.

In the accompanying drawings, forming part hereof, Figure 1 is a side elevation of a thrasher equipped with my improvement; Fig. 2, a plan view of a combined harvester and thrasher embodying my invention; and Fig 3 is an enlarged detail sectional view of a clutch which I may employ, as seen when looking in the direction of the arrows 3—3 in Fig. 1.

In said drawings the numberal 5 indicates the thrasher element of a combine, mounted upon carrying wheels 6, 7, an engine 8 being mounted on the forward end for operating the mechanisms of the thrasher and the header, 10, all of which elements may be of any desired construction and arrangement.

As my invention relates particularly to the header 10, or similar machine, it will not be necessary to describe the detail mechanisms of the thrasher other than the feeder conveyer comprising the slatted carrier 11 positioned in the seed-house 5' in a well known manner for conveying cut grain into the usual cylinder of the thrasher. The header, as is common, embodies a canvas or equivalent slatted conveyer 12, a sickle 13, and a reel (not shown), as well as other mechanisms not necessary to illustrate. The conveyer and sickle are actuated from the engine 8 by a belt or chain 14 connecting the pulleys 15, 16, the latter driving a shaft 17 provided at its opposite end with a sprocket 18, which in turn drives the chain 19 running about idler 20 and the sprocket 22 mounted on stud shaft 23, this driving system also actuating the chain 24 connected to sprocket 22 and to a clutch sprocket 26 loosely mounted on shaft 27, the telescopic drive-shaft 28 for the header mechanisms being secured in the yoke 30 mounted on said shaft 27. Clutch mechanism comprising said sprocket 26, 26', a drum 32, brake band 33, cams 34, 35, (cam 34 being fixed to shaft 27), control spring 36, and other details of construction disclosed in Letters Patent No. 1,330,193, issued February 10, 1920, upon my application, may be employed for my present purpose and which is highly practical, and it is therefore unnecessary herein to describe the construction thereof in detail, but I desire it to be understood that any suitable clutch may be adapted for carrying out my invention. Also upon shaft 27 a sprocket 38 is mounted, which is connected by chain 39 to a sprocket 40 driven by a shaft 41 from the thrasher by which means the feeder conveyer 11 is operated or discontinued with the actuation or cessation of shaft 27.

Upon the usual operator's platform 44, forming part of the thrasher, I mount a pedal 45 to which a link 46 is connected and at its lower end is attached to a lever 47 pivoted to the thrasher, at 48, the brake-band 33 also being attached to the lever, at 49, as indicated in Fig. 1, and which pedal, as shown in Fig. 2, is within convenient reach of an operator on the platform.

In operation in the field, when it becomes necessary to stop the header conveyer from traveling toward the thrasher should foreign matter be deposited upon the conveyer and also at the same time stop the feeder conveyer, or other conditions make it desirable, the operator simply steps on the pedal 45, which causes the band 33 to tighten about and grip the drum 32, whereupon the cams 34, 35, will slightly recede, thus breaking the frictional engagement of said drum and sprocket member 26', and during which action the surfaces between the drum and the sprocket become separated so that the sprocket 26 is free to continue revolving, and consequently those actuating elements of the header not requiring cessation continue operating, as well as feeder conveyer 11, and when the pedal is released the sprocket will again become engaged through the influence of the torque effect of the revolving sprocket against the friction face of the drum, the latter being initially urged against the sprocket by the torsional spring 36 and the climbing action of the cams, which cause the shaft and sprocket to revolve together as a unit in the manner described in the aforementioned patent. The clutch, as stated, is secured to the thrasher, and may be arranged to stop the entire header mechanisms simultaneously with the feeder conveyer and permit the thrashing mechanisms only to function, but it will be apparent that a clutch of any appropriate character may be arranged so that the conveyer on the header and the feeder conveyer will be stopped without discontinuing the operation of the sickle, reel or other attachments, or thrashing mechanisms, in which latter condition the cutting mechanism may continue operating to accumulate cut grain upon the conveyer in circumstances where such method is desirable. As it is at times desirable in the operation of some types of harvesters, when the grain is thin, to accumulate a quantity thereof on the header conveyer while the machine is traveling and the sickle in motion, I am enabled to accomplish this in the manner described. It will be understood also that when the feeder conveyer is heavily loaded, and said conveyer with the header conveyer stopped, the rotating thrasher cylinder will withdraw a considerable portion of the massed grain within its influence and relieve such congestion, so that when actuation of the conveyers is continued the accumulated grain on the feeder conveyer will be readily conveyed to the cylinder and slugging of the latter avoided.

I claim as my invention:

1. In a machine of the class described, a header having a traveling conveyer, means for actuating the conveyer, means for adjusting said actuating means whereby the conveyer may be stopped and started, a link connected to the adjusting means, and a pedal connected to the link for actuating said adjusting means to continue or discontinue the movement of said conveyer.

2. In a machine of the character described, a thrasher, a header embodying a conveyer, means including separable clutch members on the thrasher, a shaft on which said clutch members are mounted, a driven shaft connected to said clutch shaft and the conveyer, a brake encircling one of said clutch members, a link connected to the brake for throwing the clutch members into and out of engagement to actuate and discontinue the movement of the conveyer, and a pedal for operating the link.

3. In a machine of the character described, a thrasher, a header embodying actuating mechanisms, a shaft for operating said mechanisms, a clutch connected to said shaft, means associated with the clutch for separating and engaging the members thereof for discontinuing or starting the movement of the actuating mechanisms, and a manually operated link connected to said latter means for actuating the same.

4. In a machine of the character described, a thrasher, a header, a pedal supported on the thrasher, a link connected to the pedal and to the thrasher, a clutch on the thrasher, means for rotating the clutch, a brake-band encircling a clutch member and connected to the link, said link being operable by said pedal, and a shaft connected to the clutch for actuating a part or parts of the header.

5. In a machine of the character described, a thrasher, a header, clutch mechanism supported on the thrasher, means for driving the clutch, a brake associated with the clutch, and manually operated means connected to the brake for operating the latter to discontinue and start an actuating part of the header independently of the actuation of the thrashing mechanisms.

6. In a machine of the character described, a thrasher having a feeder conveyer, a header having a carrier for delivering material to the conveyer, and means under control of an operator for simultaneously starting and discontinuing operation of said conveyer and carrier independently of the thrashing mechanisms of the thrasher.

7. In a machine of the character described, a thrasher having a conveyer, a header having a carrier for delivering material to the conveyer, and a friction operated clutch for simultaneously starting and discontinuing operation of the conveyer and carrier independently of the thrashing mechanisms of the thrasher.

In testimony whereof I affix my signature.

NORMAN R. KRAUSE.